(12) United States Patent
Fukae et al.

(10) Patent No.: US 11,111,564 B2
(45) Date of Patent: Sep. 7, 2021

(54) CEMENTED CARBIDE, CUTTING TOOL INCLUDING SAME, AND METHOD OF PRODUCING CEMENTED CARBIDE

(71) Applicant: SUMITOMO ELECTRIC HARDMETAL CORP., Itami (JP)

(72) Inventors: Kosuke Fukae, Itami (JP); Yasuki Kido, Itami (JP); Masami Watanabe, Itami (JP); Shinya Imamura, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 16/768,214

(22) PCT Filed: Aug. 8, 2019

(86) PCT No.: PCT/JP2019/031381
§ 371 (c)(1),
(2) Date: May 29, 2020

(87) PCT Pub. No.: WO2020/070978
PCT Pub. Date: Apr. 9, 2020

(65) Prior Publication Data
US 2020/0291504 A1   Sep. 17, 2020

(30) Foreign Application Priority Data

Oct. 4, 2018   (JP) .............................. JP2018-189083

(51) Int. Cl.
*C22C 29/08*   (2006.01)
*B23B 27/14*   (2006.01)
(Continued)

(52) U.S. Cl.
CPC ................ *C22C 29/08* (2013.01); *B22F 3/12* (2013.01); *B23B 27/14* (2013.01); *C22C 1/051* (2013.01); *C22C 29/04* (2013.01)

(58) Field of Classification Search
CPC ......... C22C 29/04; C22C 29/08; C22C 1/051; C22C 29/02; B23B 27/14; B22F 3/12; B22F 2998/10; B22F 2005/001; B23F 3/12
See application file for complete search history.

(56) References Cited

U.S. PATENT DOCUMENTS

2009/0049953 A1   2/2009   Shindo et al.
2010/0014930 A1   1/2010   Taniuchi et al.
(Continued)

FOREIGN PATENT DOCUMENTS

JP   2007-069310 A   3/2007
WO   WO-2011/136197 A1   11/2011
(Continued)

*Primary Examiner* — Jessee R Roe
(74) *Attorney, Agent, or Firm* — Faegre Drinker Biddle & Reath LLP

(57) ABSTRACT

A cemented carbide includes second hard phase grains, wherein the second hard phase grains includes a core portion, and in a case where a total of 70 unit regions that are each constituted of a square having each side of 8μm are provided by successively arranging 7 unit regions in a longitudinal direction and 10 unit regions in a lateral direction in an electron microscope image of any cross section of the cemented carbide captured at a magnification of 1500×, where the total number of core portions in the total of 70 unit regions is calculated, and where a percentage of the number of core portions in each of the unit regions with respect to the total number of core portions is calculated, the number of unit regions in which the percentage is less than 0.43% or more than 2.43% is less than or equal to 10.

8 Claims, 4 Drawing Sheets

(51) Int. Cl.
*C22C 1/05* (2006.01)
*C22C 29/04* (2006.01)
*B22F 3/12* (2006.01)

(56) References Cited

U.S. PATENT DOCUMENTS

2013/0036866 A1 2/2013 Tamura et al.
2018/0222804 A1 8/2018 Kido et al.
2020/0048747 A1 2/2020 Michiuchi et al.

FOREIGN PATENT DOCUMENTS

WO WO-2017/191744 A1 11/2017
WO WO-2018/194018 A1 10/2018

| 5 | 13 | 15 | 15 | 10 | 5 | 11 | 13 | 11 | 7 |
|---|---|---|---|---|---|---|---|---|---|
| 16 | 14 | 14 | 3 | 10 | 11 | 13 | 5 | 11 | 12 |
| 15 | 3 | 11 | 10 | 6 | 11 | 11 | 5 | 11 | 7 |
| 8 | 9 | 10 | 5 | 2 | 9 | 15 | 10 | 5 | 8 |
| 9 | 20 | 6 | 10 | 10 | 12 | 8 | 4 | 8 | 8 |
| 9 | 12 | 13 | 18 | 8 | 10 | 13 | 9 | 8 | 7 |
| 12 | 2 | 4 | 8 | 7 | 5 | 12 | 10 | 4 | 14 |

| 0.75% | 1.95% | 2.26% | 2.26% | 1.50% | 0.75% | 1.65% | 1.95% | 1.65% | 1.05% |
|---|---|---|---|---|---|---|---|---|---|
| 2.41% | 2.11% | 2.11% | 0.45% | 1.50% | 1.65% | 1.95% | 0.75% | 1.65% | 1.80% |
| 2.26% | 0.45% | 1.65% | 1.50% | 0.90% | 1.65% | 1.65% | 0.75% | 1.65% | 1.05% |
| 1.20% | 1.35% | 1.50% | 0.75% | 0.30% | 1.35% | 2.26% | 1.50% | 0.75% | 1.20% |
| 1.35% | 3.01% | 0.90% | 1.50% | 1.50% | 1.80% | 1.20% | 0.60% | 1.20% | 1.20% |
| 1.35% | 1.80% | 1.95% | 2.71% | 1.20% | 1.50% | 1.95% | 1.35% | 1.20% | 1.05% |
| 1.80% | 0.30% | 0.60% | 1.20% | 1.05% | 0.75% | 1.80% | 1.50% | 0.60% | 2.11% |

| 9 | 18 | 40 | 28 | 26 | 40 | 62 | 69 | 29 | 11 |
|---|---|---|---|---|---|---|---|---|---|
| 9 | 26 | 18 | 18 | 17 | 34 | 33 | 27 | 21 | 15 |
| 34 | 30 | 23 | 5 | 19 | 14 | 17 | 15 | 28 | 19 |
| 6 | 7 | 14 | 8 | 15 | 55 | 14 | 29 | 13 | 8 |
| 22 | 6 | 11 | 15 | 21 | 33 | 5 | 11 | 5 | 20 |
| 16 | 8 | 14 | 17 | 20 | 15 | 16 | 11 | 27 | 12 |
| 15 | 19 | 14 | 10 | 14 | 11 | 21 | 53 | 39 | 25 |

| 0.62% | 1.24% | 2.76% | 1.93% | 1.79% | 2.76% | 4.28% | 4.76% | 2.00% | 0.76% |
|---|---|---|---|---|---|---|---|---|---|
| 0.62% | 1.79% | 1.24% | 1.24% | 1.17% | 2.35% | 2.28% | 1.86% | 1.45% | 1.04% |
| 2.35% | 2.07% | 1.59% | 0.35% | 1.31% | 0.97% | 1.17% | 1.04% | 1.93% | 1.31% |
| 0.41% | 0.48% | 0.97% | 0.55% | 1.04% | 3.80% | 0.97% | 2.00% | 0.90% | 0.55% |
| 1.52% | 0.41% | 0.76% | 1.04% | 1.45% | 2.28% | 0.35% | 0.76% | 0.35% | 1.38% |
| 1.10% | 0.55% | 0.97% | 1.17% | 1.38% | 1.04% | 1.10% | 0.76% | 1.86% | 0.83% |
| 1.04% | 1.31% | 0.97% | 0.69% | 0.97% | 0.76% | 1.45% | 3.66% | 2.69% | 1.73% | ns
CEMENTED CARBIDE, CUTTING TOOL INCLUDING SAME, AND METHOD OF PRODUCING CEMENTED CARBIDE

TECHNICAL FIELD

The present disclosure relates to a cemented carbide, a cutting tool including the cemented carbide, and a method of producing the cemented carbide. The present application claims a priority based on Japanese Patent Application No. 2018-189083 filed on Oct. 4, 2018, the entire content of which is incorporated herein by reference.

BACKGROUND ART

As hard materials including titanium (Ti), a cemented carbide, a cermet, and the like have been known. These hard materials are excellent in wear resistance and have been therefore used suitably for cutting tools, wear-resistant tools, and the like. For example, WO 2011/136197 (Patent Literature 1) discloses a cermet including: a first hard phase composed of a composite carbonitride including Ti; a second hard phase composed of tungsten carbide (WC); and a binder phase mainly composed of one or both of cobalt (Co) and nickel (Ni). Further, WO 2017/191744 (Patent Literature 2) discloses a cemented carbide including: a first hard phase mainly composed of WC; and a second hard phase mainly composed of a composite carbonitride including Ti and W.

CITATION LIST

Patent Literature

PTL 1: WO 2011/136197
PTL 2: WO 2017/191744

SUMMARY OF INVENTION

A cemented carbide according to one embodiment of the present disclosure includes: first hard phase grains each including WC; second hard phase grains each including a carbonitride containing Ti and Nb; and a metal binder phase including an iron group element, wherein each of the second hard phase grains includes a core portion in a form of a grain and a peripheral portion that coats at least a portion of the core portion, the core portion is composed of a composite carbonitride represented by $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, the Z is more than or equal to 0 and less than or equal to 0.02, the peripheral portion has a composition different from a composition of the core portion, and in a case where a total of 70 unit regions that are each constituted of a square having each side of 8 µm are provided by successively arranging 7 unit regions in a longitudinal direction and 10 unit regions in a lateral direction in an electron microscope image of any cross section of the cemented carbide captured at a magnification of 1500×, where the total number of core portions in the total of 70 unit regions is calculated by counting the number of core portions in each of the unit regions, and where a percentage of the number of core portions in each of the unit regions with respect to the total number of core portions is calculated, the number of unit regions in which the percentage is less than 0.43% or more than 2.43% is less than or equal to 10.

A cutting tool according to one embodiment of the present disclosure includes the above-described cemented carbide.

A method of producing a cemented carbide according to one embodiment of the present disclosure includes: obtaining a powder of a composite carbonitride represented by $Ti_{1-X-Z}Nb_XM_ZC_{1-Y}N_Y$; obtaining a powder mixture by using a ball mill to mix the powder of the composite carbonitride, a WC powder, and an iron group element powder for more than or equal to 9 hours and less than or equal to 15 hours; obtaining a molded body by performing pressure molding to the powder mixture; and obtaining a sintered material by sintering the molded body, wherein the M is at least one impurity element selected from a group consisting of V, Cr, and Mo, the X is more than or equal to 0.1 and less than or equal to 0.2, the Y is more than or equal to 0.3 and less than or equal to 0.6, the Z is more than or equal to 0 and less than or equal to 0.02, and the obtaining of the powder of the composite carbonitride includes obtaining a third powder by mixing a first powder including Ti and Nb and a second powder at least including graphite, obtaining a granulated body by granulating the third powder, obtaining a powder precursor composed of the composite carbonitride by thermally treating the granulated body at more than or equal to 1800° C. under an atmosphere including nitrogen gas, and obtaining the powder of the composite carbonitride by pulverizing the powder precursor.

DETAILED DESCRIPTION

Figure 1:
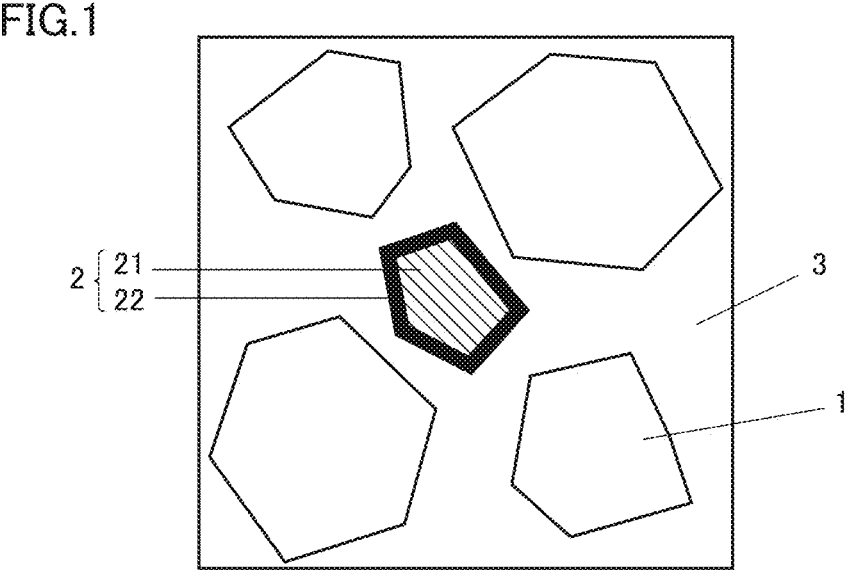
FIG. 1 is a schematic view schematically showing one cross section of a cemented carbide according to the present embodiment.

Problem to be Solved by the Present Disclosure

In the hard material of Patent Literature 1, the composite carbonitride has a core represented by $(Ti_{1-x-y}L_xMo_y)(C_{1-z}N_z)$. In this chemical formula, L is at least one element selected from a group consisting of Zr, Hf, Nb, and Ta, x is more than or equal to 0.01 and less than or equal to 0.5, y is more than or equal to 0.03 and less than or equal to 0.05, and z is more than or equal to 0.05 and less than or equal to 0.75. Therefore, in the composite carbonitride, an atomic ratio of Mo in all the metallic elements (Ti, L, and Mo) is more than or equal to 0.03. However, Mo serves to deteriorate a reaction resistance (hereinafter, also referred to as "welding resistance") of the carbonitride against steel. Hence, a small content of Mo is preferable.

Patent Literature 2 discloses that the second hard phase mainly composed of the composite carbonitride including Ti and W is dispersed uniformly in the whole of the cemented carbide by decreasing a distance ($\sigma^2$) between the respective centers of gravity of two grains closest to each other, thereby improving breakage resistance. However, Patent Literature 2 does not state the reaction resistance of the cemented carbide against steel. Thus, no hard material having an excellent reaction resistance against steel has been obtained yet. Development of such a hard material has been desired.

In view of the above-described actual circumstance, the present disclosure has an object to provide a cemented carbide having an excellent reaction resistance against steel, a cutting tool including the cemented carbide, and a method of producing the cemented carbide.

Advantageous Effect of the Present Disclosure

According to the present disclosure, there can be provided a cemented carbide having an excellent reaction resistance against steel, a cutting tool including the cemented carbide, and a method of producing the cemented carbide.

Description of Embodiments

The present inventors developed a cemented carbide including, as a new source material, a carbonitride containing Ti and Nb (hereinafter, also referred to as "TiNbMCN"). It was found out that since TiNbMCN is included, this cemented carbide has a more excellent reaction resistance against steel than that of a conventional Ti-based compound. Furthermore, it was found out that both the reaction resistance against steel and a mechanical strength can be secured by appropriately controlling a compositions of Nb and N in TiNbMCN.

However, TiNbMCN is likely to be aggregated in a cemented carbide. It was found that if particle sizes of TiNbMCN are made small in order to prevent the aggregation, Ti and Nb in TiNbMCN tends to be dissolved in WC crystals in a solid state in a sintering step for producing the cemented carbide. Based on this finding, a cemented carbide having a more improved reaction resistance against steel was conceived by dispersing TiNbMCN in the cemented carbide in a balanced manner while avoiding TiNbMCN from being dissolved in WC crystals in the solid state. In this way, the present inventors arrived at the present disclosure.

First, embodiments of the present disclosure are listed and described.

[1] A cemented carbide according to one embodiment of the present disclosure includes: first hard phase grains each including WC; second hard phase grains each including a carbonitride containing Ti and Nb; and a metal binder phase including an iron group element, wherein each of the second hard phase grains includes a core portion in a form of a grain and a peripheral portion that coats at least a portion of the core portion, the core portion is composed of a composite carbonitride represented by $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, the Z is more than or equal to 0 and less than or equal to 0.02, the peripheral portion has a composition different from a composition of the core portion, and in a case where a total of 70 unit regions that are each constituted of a square having each side of 8 μm are provided by successively arranging 7 unit regions in a longitudinal direction and 10 unit regions in a lateral direction in an electron microscope image of any cross section of the cemented carbide captured at a magnification of 1500×, where the total number of core portions in the total of 70 unit regions is calculated by counting the number of core portions in each of the unit regions, and where a percentage of the number of core portions in each of the unit regions with respect to the total number of core portions is calculated, the number of unit regions in which the percentage is less than 0.43% or more than 2.43% is less than or equal to 10. The cemented carbide having such a feature can have an excellent reaction resistance against steel.

[2] Preferably, each of the core portions the number of which is counted in each of the unit regions has a grain size of more than or equal to 0.2 μm and less than or equal to 3 μm. Accordingly, the core portions having such grain sizes that the core portions are not dissolved in WC crystals in the solid state and are less likely to be aggregated can be dispersed in the cemented carbide in a balanced manner, thus attaining an excellent reaction resistance against steel.

[3] Preferably, the peripheral portion is a carbonitride containing Ti, Nb, and W. Accordingly, a more excellent reaction resistance against steel can be attained.

[4] Preferably, an integrated value of 50% in an area-based distribution of grain sizes of the core portions is more than or equal to 0.2 μm and less than or equal to 2 μm. Accordingly, an excellent reaction resistance against steel can be attained with a good yield.

[5] Preferably, a volume ratio of the core portions in the cemented carbide is more than or equal to 2 volume % and less than or equal to 10 volume %. Accordingly, an excellent reaction resistance against steel can be attained with a good yield.

[6] A cutting tool according to one embodiment of the present disclosure includes the above-described cemented carbide. Such a cutting tool can have not only an excellent mechanical strength intrinsic to cemented carbides, but also an excellent reaction resistance against steel.

[7] Preferably, the cutting tool includes: a substrate composed of the cemented carbide; and a coating film that coats the substrate. Such a cutting tool also can have not only an excellent mechanical strength intrinsic to cemented carbides, but also an excellent reaction resistance against steel.

[8] A method of producing a cemented carbide according to one embodiment of the present disclosure includes: obtaining a powder of a composite carbonitride represented by $Ti_{1-X-Z}Nb_XM_ZC_{1-Y}N_Y$; obtaining a powder mixture by using a ball mill to mix the powder of the composite carbonitride, a WC powder, and an iron group element powder for more than or equal to 9 hours and less than or equal to 15 hours; obtaining a molded body by performing pressure molding to the powder mixture; and obtaining a sintered material by sintering the molded body, wherein the M is at least one impurity element selected from a group consisting of V, Cr, and Mo, the X is more than or equal to 0.1 and less than or equal to 0.2, the Y is more than or equal to 0.3 and less than or equal to 0.6, the Z is more than or equal to 0 and less than or equal to 0.02, and the obtaining of the powder of the composite carbonitride includes obtaining a third powder by mixing a first powder including Ti and Nb and a second powder at least including graphite, obtaining a granulated body by granulating the third powder, obtaining a powder precursor composed of the composite carbonitride by thermally treating the granulated body at more than or equal to 1800° C. under an atmosphere including nitrogen gas, and obtaining the powder of the composite carbonitride by pulverizing the powder precursor. According to such a method of producing a cemented carbide, a cemented carbide having an excellent reaction resistance against steel can be produced.

Details of Embodiments of the Present Disclosure

Though an embodiment of the present disclosure (hereinafter also denoted as the "present embodiment") will be described hereinafter in detail, the present embodiment is not limited thereto. In the description below, explanation will be made with reference to figures.

Here, in the present specification, the expression "A to B" represents a range of lower to upper limits (i.e., more than or equal to A and less than or equal to B). When no unit is indicated for A and a unit is indicated only for B, the unit of A is the same as the unit of B. Moreover, when a compound or the like is expressed by a chemical formula in the present specification and an atomic ratio is not particularly limited, it is assumed that all the conventionally known atomic ratios are included. The atomic ratio is not necessarily limited only to one in the stoichiometric range. For example, when "TiAlN" is described, an atomic ratio in the TiAlN is not limited to Ti:Al:N=0.5:0.5:1, and include all the conventionally known atomic ratios. The same also applies to compounds other than the "TiAlN". In the present embodiment, a metallic element and a nonmetallic element does not necessarily need to constitute a stoichiometric composition. Examples of the metallic element include titanium (Ti), aluminum (Al), silicon (Si), tantalum (Ta), chromium (Cr), niobium (Nb), and tungsten (W). Examples of the nonmetallic element include nitrogen (N), oxygen (O), and carbon (C). In the present specification, the term "mechanical strength" means a mechanical strength including various characteristics such as wear resistance, breakage resistance, bending strength, and the like of the cemented carbide.

<<Cemented Carbide>>

As shown in FIG. 1, a cemented carbide according to the present embodiment includes: first hard phase grains 1 each including WC; second hard phase grains 2 each including a carbonitride containing Ti and Nb; and a metal binder phase 3 including an iron group element. Each of second hard phase grains 2 includes a core portion 21 in a form of a grain and a peripheral portion 22 that coats at least a portion of core portion 21. Core portion 21 is composed of a composite carbonitride represented by $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, and the Z is more than or equal to 0 and less than or equal to 0.02. Peripheral portion 22 has a composition different from a composition of core portion 21.

Figures 2A, 2B, 2C:
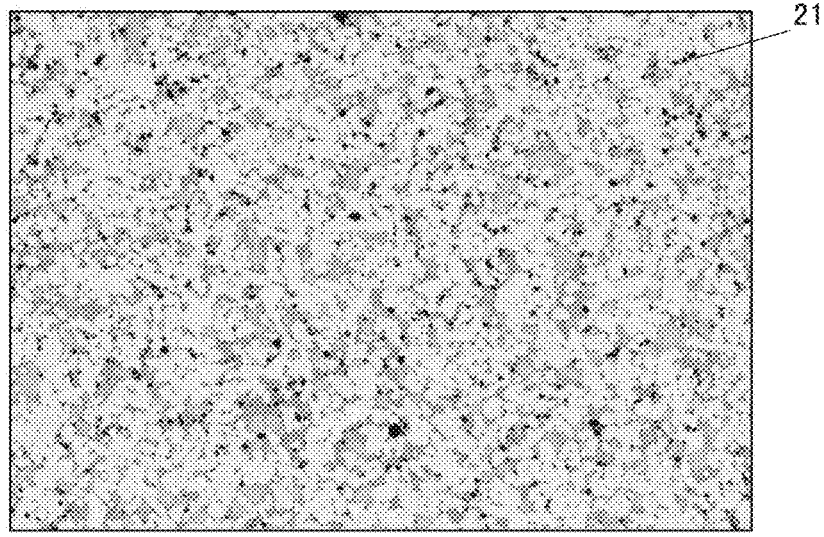
FIG. 2A is an illustration representing a photograph showing an electron microscope image of one cross section of a cemented carbide according to a sample 12.
FIG. 2B is an explanatory diagram showing the number of core portions in each unit region provided in the electron microscope image shown in FIG. 2A.
FIG. 2C is an explanatory diagram showing, in a percentage, the number of core portions in each unit region with respect to the total number of core portions in a total of 70 unit regions provided in the electron microscope image shown in FIG. 2A.

Further, as shown in, for example, FIG. 2A to FIG. 2C, in the cemented carbide according to the present embodiment, in a case where a total of 70 unit regions that are each constituted of a square having each side of 8 μm are provided by successively arranging 7 unit regions in a longitudinal direction and 10 unit regions in a lateral direction in an electron microscope image of any cross section of the cemented carbide captured at a magnification of 1500×, where the total number of core portions in the total of 70 unit regions is calculated by counting the number of core portions in each of the unit regions, and where a percentage of the number of core portions in each of the unit regions with respect to the total number of core portions is calculated, the number of unit regions in which the percentage is less than 0.43% or more than 2.43% is less than or equal to 10. The cemented carbide having such a feature can have an excellent reaction resistance against steel.

<First Hard Phase Grains>

Each of first hard phase grains 1 includes WC. Preferably, first hard phase grain 1 is mainly composed of WC (tungsten carbide). In addition to WC, first hard phase grain 1 can include: an inevitable element introduced during a production process for WC; a small amount of impurity element; and the like. In order to exhibit the effect of the present disclosure, the content of WC in first hard phase grain 1 is preferably more than or equal to 99 mass %, and is more preferably substantially 100 mass %. Examples of elements that can be included in first hard phase grain 1 in addition to W and C include molybdenum (Mo), chromium (Cr), and the like.

In the cemented carbide, the content of first hard phase grains 1 is preferably 65 to 95 volume %. When the content of first hard phase grains 1 in the cemented carbide is less than 65 volume %, a sufficient mechanical strength does not tend to be obtained. When the content of first hard phase grains 1 in the cemented carbide is more than 95 volume %, a sufficient toughness does not tend to be obtained. A preferable content of first hard phase grains 1 in the cemented carbide is 75 to 85 volume %.

The content (volume %) of first hard phase grains 1 can be calculated using the following measurement method. Specifically, the cemented carbide is subjected to a CP (Cross Section Polisher) process using an argon ion beam or the like, thereby obtaining a sample having a smooth cross section. An image of the cross section of this sample is captured at 5000× using a field emission scanning electron microscope (FE-SEM; trademark: "JSM-7000F" provided by JEOL), thereby obtaining an electron microscope image (SEM-BSE image) of the cross section of the sample. Moreover, external contours of first hard phase grains 1 in this electron microscope image are specified.

Next, based on a binarization process using image analysis software (trademark: "Mac-View" provided by MOUNTECH), a total (total area) of areas of all the first hard phase grains 1 in the electron microscope image is calculated. Finally, by assuming that this total area is continuous in the depth direction of the cross section, the total area can be regarded as the content (volume %) of first hard phase grains 1 in the cemented carbide. Particularly, the content (volume %) of first hard phase grains 1 is preferably calculated as an average value of total areas of first hard phase grains 1 calculated in five electron microscope images (five visual fields), which are prepared while avoiding overlapped image-captured portions in the cross section of the sample.

<Second Hard Phase Grain>

Second hard phase grain 2 includes a carbonitride containing Ti and Nb. Each of second hard phase grains 2 includes a core portion 21 in a form of a grain and a peripheral portion 22 that coats at least a portion of core portion 21. Core portion 21 is composed of a composite carbonitride represented by $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, and the Z is more than or equal to 0 and less than or equal to 0.02. Peripheral portion 22 has a composition different from a composition of core portion 21. Particularly, peripheral portion 22 is preferably a carbonitride containing Ti, Nb, and W. When the composition (Ti, Nb, C, and N) of core portion 21 in the form of a grain in each of second hard phase grains 2 has an atomic ratio falling within the above-described range, the cemented carbide can have an excellent reaction resistance against steel. The at least one impurity element represented by M and selected from the group consisting of V, Cr and Mo will be described later.

In the cemented carbide, the content of second hard phase grains 2 is preferably 2 to 15 volume %. When the content of second hard phase grains 2 in the cemented carbide is less than 2 volume %, a sufficient reaction resistance against steel does not tend to be obtained. When the content of second hard phase grains 2 in the cemented carbide is more than 15 volume %, a sufficient mechanical strength does not tend to be obtained. A preferable content of second hard phase grains 2 in the cemented carbide is 5 to 10 volume %.

The content (volume %) of second hard phase grains 2 can be calculated by the same method as the method of measuring the content of first hard phase grains 1.

(Core Portion)

Core portion 21 is composed of a composite carbonitride represented by $Ti_{1-X-Z}Nb_XM_ZC_{1-Y}N_Y$. X is more than or equal to 0.1 and less than or equal to 0.2, Y is more than or equal to 0.3 and less than or equal to 0.6, and Z is more than or equal to 0 and less than or equal to 0.02. That is, in core portion 21, Ti is a main component and Nb is a sub component. M is at least one impurity element selected from a group consisting of V, Cr, and Mo. In order that an amount of addition of the sub component is less than or equal to a solid solubility limit and effects of Ti and Nb, which are added metallic elements, are sufficiently exhibited, the atomic ratio (1-X-Z) of Ti is more than or equal to 0.8 and less than or equal to 0.9. In order to obtain an excellent reaction resistance against steel, Y representing the atomic ratio of nitrogen (N) in the composite carbonitride is more than or equal to 0.3 and less than or equal to 0.6. The composition of core portion 21 should not be limited in particular as long as the effect of the present disclosure is exhibited, the atomic ratios (X, Y, Z) fall within the above-described ranges, and the composition of core portion 21 is different from the composition of peripheral portion 22. Examples of the composition of core portion 21 include $Ti_{0.85}Nb_{0.15}C_{0.5}N_{0.5}$, $Ti_{0.8}Nb_{0.2}C_{0.45}N_{0.55}$, and the like.

Here, in the composite carbonitride of core portion 21 represented by $Ti_{1-X-Z}Nb_XM_ZC_{1-Y}N_Y$, X is preferably more than or equal to 0.12 and less than or equal to 0.18. Further, X is more preferably more than or equal to 0.14 and less than or equal to 0.16. Y is preferably more than or equal to 0.4 and less than or equal to 0.55. Accordingly, an excellent reaction resistance against steel is obtained while preferable characteristics can be obtained in terms of a mechanical strength such as wear resistance and breakage resistance.

The composition and atomic ratio of the composite carbonitride included in core portion 21 can be identified by analyzing, using an energy dispersive X-ray spectrometer (EDX) in the field emission scanning electron microscope (FE-SEM) or an electron probe microanalyzer (EPMA), core portion 21 included in second hard phase grain 2 appearing in the electron microscope image having the cross section of the cemented carbide. The composition of WC in first hard phase grain 1 and the composition of the below-described iron group element in metal binder phase 3 can be also identified using the same measurement method by analyzing first hard phase grain 1 and metal binder phase 3 both appearing in the above-described electron microscope image.

(Degree of Dispersion of Core Portions)

In the cemented carbide according to the present embodiment, in a case where a total of 70 unit regions R that are each constituted of a square having each side of 8 μm are provided by successively arranging 7 unit regions R in a longitudinal direction and 10 unit regions R in a lateral direction in an electron microscope image of any cross section of the cemented carbide captured at a magnification of 1500×, where the total number of core portions in the total of 70 unit regions R is calculated by counting the number of core portions in each of the unit regions R, and where a percentage of the number of core portions in each of the unit regions R with respect to the total number of core portions is calculated, the number of unit regions R in which the percentage is less than 0.43% or more than 2.43% is less than or equal to 10.

As described above, the present inventors arrived at a cemented carbide having an improved reaction resistance against steel by dispersing $Ti_{1-X-Z}Nb_XM_ZC_{1-Y}N_Y$, which serves as the core portions, in the cemented carbide in a balanced manner while avoiding $Ti_{1-X-Z}Nb_XM_ZC_{1-Y}N_Y$ from being dissolved in the solid state in the WC crystals. Specifically, in an electron microscope image having any cross section of the cemented carbide captured therein, a total of 70 unit regions each having a predetermined size were provided, the number of core portions in each of the unit regions was counted, and the number of core portions in each of the unit regions was calculated in a percentage. Further, the number of unit regions in which the number of core portions indicated by this percentage falls out of a certain range (0.43 to 2.43%) is calculated.

As a result, it was found that when the number of unit regions in which the number of core portions falls out of the certain range is less than or equal to 10, the core portions are evaluated to be dispersed uniformly in the cemented carbide in a balanced manner, with the result that the cemented carbide has an excellent reaction resistance against steel. Further, it was also found that when the number of such unit regions is more than or equal to 11, it tends to be difficult for the cemented carbide to have a desired excellent reaction resistance against steel. Here, in the present specification, the term "degree of dispersion of the core portions" may be used in order to indicate whether or not the core portions are dispersed uniformly in the cemented carbide in a balanced manner in accordance with whether the "degree of dispersion of the core portions" is high or low in the cemented carbide.

With reference to FIG. 2A to FIG. 2C, the following describes a method (hereinafter, also referred to as "degree-of-dispersion measurement method") of evaluating whether the degree of dispersion of the core portions is high or low in the present embodiment. Each of FIG. 2A to FIG. 2C is a diagram corresponding to a cemented carbide produced as a sample 12 in a below-described Example.

First, by performing a CP process to the cemented carbide using an argon ion beam, a smooth cross section of the cemented carbide is prepared. An image of this cross section is captured at 1500× using a field emission scanning electron microscope (FE-SEM; trademark: "JSM-7000F" provided by JEOL), thereby obtaining an electron microscope image (SEM-BSE image) shown in FIG. 2A.

Next, a total of 70 unit regions R are provided by arranging 7 unit regions R in the longitudinal direction and 10 unit regions R in the lateral direction in the electron microscope image as shown in FIG. 2B. Further, by performing image analysis using image analysis software (trademark: "Mac-View" provided by MOUNTECH), the number of core portions 21 in each of unit regions R is counted. Then, the total number of core portions 21 in the total of 70 unit regions R is calculated, and a percentage of the number of core portions 21 in each unit region R with respect to the total number of core portions 21 is calculated as shown in FIG. 2C.

Since the total of 70 unit regions R are provided by arranging 7 unit regions R in the longitudinal direction and 10 unit regions R in the lateral direction in the electron microscope image, the number of core portions 21 in each unit region R as indicated by the percentage is 1.43% (1/70×100%) when core portions 21 are dispersed uniformly in a completely balanced manner in the cemented carbide. Hence, it is determined that the number of core portions 21 in a unit region R is balanced when the number (percentage) of core portions 21 counted in unit region R falls within a range of 0.43 to 2.43%, which are within ±1% with respect to 1.43%. On the other hand, it is determined that the number of core portions 21 is imbalanced in a unit region R when the number (percentage) of core portions 21 counted in unit region R is less than 0.43% or more than 2.43%, which are more than or less than ±1% with respect to 1.43%.

Next, with such a determination, the number of unit regions R in which the number of core portions 21 as indicated by the above-described percentage is less than 0.43% or more than 2.43% is calculated. Accordingly, as the number of unit regions R in which the number of such core portions 21 is less than 0.43% or more than 2.43% is smaller, the cemented carbide in the electron microscope image can be evaluated such that core portions 21 are dispersed more uniformly in a more balanced manner. In other words, in the cemented carbide in which the number of unit regions R in which the number of such core portions 21 is less than 0.43% or more than 2.43% is less than or equal to 10 (less than or equal to 15% of the total number of unit regions R), the degree of dispersion of core portions 21 is high, thus attaining an excellent reaction resistance against steel. In view of the above, by analyzing whether or not the number of unit regions R in which the above-described percentage is less than 0.43% or more than 2.43% is less than or equal to 10 in the electron microscope image, it is possible to evaluate whether the degree of dispersion of core portions 21 in the cemented carbide is high or low.

In FIG. 2C, the number of unit regions R in which the above-described percentage is less than 0.43% or more than 2.43% is 4 (6% of the total number of unit regions R). Accordingly, the cemented carbide (sample 12) in the electron microscope image of FIG. 2A can be evaluated to have a high degree of dispersion of core portions 21. Hence, it is considered that an excellent reaction resistance against steel is attained.

Figures 3A, 3B, 3C:
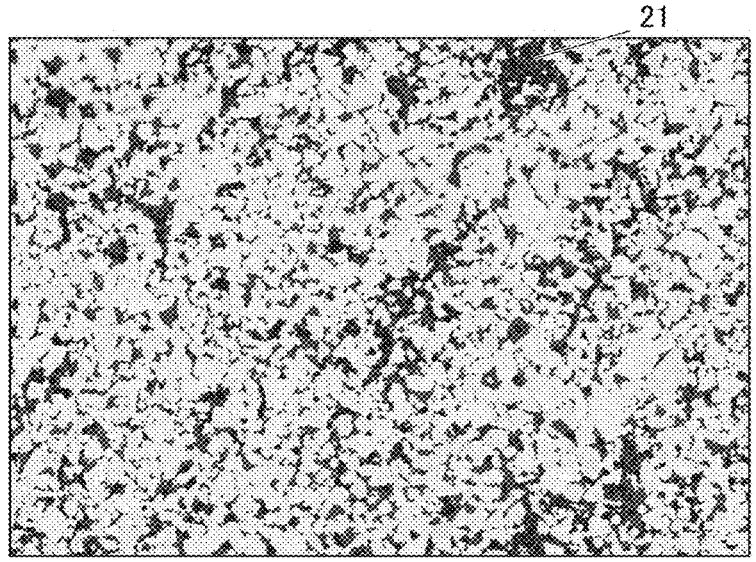
FIG. 3A is an illustration representing a photograph showing an electron microscope image of one cross section of a cemented carbide according to a sample 114.
FIG. 3B is an explanatory diagram showing the number of core portions in each unit region provided in the electron microscope image shown in FIG. 3A.
FIG. 3C is an explanatory diagram showing, in a percentage, the number of core portions in each unit region with respect to the total number of core portions in a total of 70 unit regions provided in the electron microscope image shown in FIG. 3A.

On the other hand, each of FIG. 3A to FIG. 3C is a diagram corresponding to a cemented carbide produced as a sample 114 serving as a Reference Example described later. FIG. 3A is an illustration representing a photograph showing an electron microscope image of one cross section of the cemented carbide according to sample 114. FIG. 3B is an explanatory diagram showing the number of core portions in each unit region provided in the electron microscope image shown in FIG. 3A. FIG. 3C is an explanatory diagram showing, in a percentage, the number of core portions in each unit region with respect to the total number of core portions in a total of 70 unit regions provided in the electron microscope image shown in FIG. 3A. In FIG. 3C, in the cemented carbide of sample 114, the number of unit regions R in which the above-described percentage is less than 0.43% or more than 2.43% is 12 (17% of the total number of unit regions R). Accordingly, the cemented carbide (sample 114) in the electron microscope image of FIG. 3A can be evaluated to have a low degree of dispersion of core portions 21. Hence, it is considered to be difficult to attain a desired reaction resistance against steel.

In the above-described degree-of-dispersion measurement method, each of core portions 21, which are located in unit regions R and the number of which is counted by performing the image analysis using the above-described image analysis software, preferably has a grain size of more than or equal to 0.2 μm and less than or equal to 3 gm. In other words, it is preferable to count only the number of core portions 21 located in unit regions R and each having a grain size of more than or equal to 0.2 μm and less than or equal to 3 μm. This is to count only core portions 21 (composite carbonitride represented by $Ti_{1-X}Nb_XC_{1-Y}N_Y$) not dissolved in WC crystals in the solid state in the degree-of-dispersion measurement method. Accordingly, core portions 21, which have such appropriate grain sizes that core portions 21 are less likely to be aggregated and are avoided from being dissolved in the WC crystals in the solid state, can be dispersed in the cemented carbide in a balanced manner. Such a cemented carbide can have a more excellent reaction resistance against steel.

Core portions 21 each having a grain size of less than 0.2 μm in unit regions R tend to cause aggregation in the cemented carbide and adversely affect the reaction resistance against steel. It is difficult for core portions 21 each having a grain size of more than 3 μm in unit regions R to be finely dispersed in the cemented carbide, and such core portions 21 therefore tend to adversely affect the reaction resistance against steel. It should be noted that a method of measuring the grain size of each core portion 21 will be described later.

Further, in the above-described degree-of-dispersion measurement method, when a core portion 21 exists to range over adjacent unit regions R, this core portion 21 is counted assuming that this core portion 21 is included in a unit region R having a smaller number of core portions 21 in unit regions R over which core portion 21 exist to range. In the above-described degree-of-dispersion measurement method, five electron microscope images (five visual fields) of one cross section of the cemented carbide are prepared while avoiding overlapped image-captured portions. These five visual fields are preferably constituted of: one visual field located at the center portion of the one cross section; and four visual fields located at the upper and lower sides and the right and left sides with respect to the foregoing one visual field. In the above-described degree-of-dispersion measurement method, in each of the above-described five visual fields, the number of unit regions R in which the percentage is less than 0.43% or more than 2.43% is calculated. Only when the number of such unit regions R is less than or equal to 10 in each of the five visual fields, the cemented carbide in the above-described electron microscope image is evaluated to have an excellent reaction resistance against steel.

(Impurity Element Permitted in Core Portion)

Core portion 21 is composed of a composite carbonitride represented by $Ti_{1-X-Z}Nb_XM_ZC_{1-Y}N_Y$ as described above. M is at least one impurity element selected from a group consisting of V, Cr, and Mo. Therefore, core portion 21 may include at least one impurity element selected from the group consisting of V, Cr, and Mo. In this case, Z is preferably more than or equal to 0 and less than or equal to 0.02, i.e., the total amount of V, Cr, and Mo is preferably less than 2 atom % with respect to the whole amount of Ti, Nb, V, Cr, and Mo. This makes it possible to sufficiently suppress V, Cr, and Mo, which are elements that adversely affect the reaction resistance of the cemented carbide against steel.

The composite carbonitride serving as each core portion 21 is a carbonitride composed of Ti, which is a main component, and Nb, which is a sub component; however, in an exceptional case, the composite carbonitride may include V, Cr, and Mo, which are metallic elements serving as impurity elements. Regarding amounts of these impurity elements permitted to be included in core portion 21, the total amount of V, Cr, and Mo is preferably less than 2 atom % with respect to the whole amount of Ti, Nb, V, Cr, and Mo. When the total amount of V, Cr, and Mo is more than or equal to 2 atom %, the metallic elements serving as impurity elements tend to affect the reaction resistance of the composite carbonitride against steel.

(D50 of Core Portions)

An integrated value of 50% in an area-based distribution of the grain sizes of core portions 21 (hereinafter, also referred to as "D50 of the core portions") is preferably more than or equal to 0.2 μm and less than or equal to 2 μm. Accordingly, an excellent reaction resistance against steel can be attained with a good yield.

That is, when core portions 21 appearing in the electron microscope image used to measure the degree of dispersion of the core portions are measured, the D50 of core portions 21 is preferably more than or equal to 0.2 μm and less than or equal to 2 μm. The D50 of core portions 21 is more preferably more than or equal to 0.6 μm and less than or equal to 1.6 μm, and is further preferably more than or equal to 0.8 μm and less than or equal to 1.4 μm. When the D50 of core portions 21 is less than 0.2 μm, it tends to be difficult to obtain a desired reaction resistance against steel. When the D50 of core portions 21 is more than 2 μm, it tends to be difficult to obtain a sufficient mechanical strength.

The grain size of each core portion 21 can be calculated based on the electron microscope image used to measure the degree of dispersion of the core portions as described above. Specifically, core portion 21 is specified by performing a binarization process to the above-described electron microscope image using the image analysis software utilized to measure the content of the first hard phase grains. Further, the diameter (equivalent circle diameter) of a circle having an area equal to that of core portion 21 is calculated, and this equivalent circle diameter is regarded as the grain size of core portion 21. For the D50 of core portions 21 (the integrated value of 50% in the area-based distribution of the grain sizes of core portions 21), an average value of calculated equivalent circle diameters of all the core portions 21 appearing in the above-described electron microscope image can be employed.

(Volume Ratio of Core Portions)

A volume ratio of core portions 21 in the above-described cemented carbide is preferably more than or equal to 2 volume % and less than or equal to 10 volume %. Accordingly, an excellent reaction resistance against steel can be attained with a good yield. The volume ratio of core portions 21 in the cemented carbide is more preferably more than or equal to 4 volume % and less than or equal to 8 volume %.

The volume ratio of core portions 21 in the cemented carbide can be calculated in the same manner as in the case of calculating the grain sizes of core portions 21 in the process until core portions 21 are specified using the image analysis software. Specifically, after specifying core portions 21 using the image analysis software, the area ratio of core portions 21 in the electron microscope image is calculated, and this area ratio is assumed to be continuous in the depth direction of the above-described cross section, whereby the area ratio can be calculated as the volume ratio of core portions 21 in the cemented carbide. For the volume ratio of core portions 21 in the cemented carbide, it is preferable to employ an average value of respective volume ratios thereof calculated in five electron microscope images (five visual fields) each prepared to have a cross section of one cemented carbide captured therein.

(Peripheral Portion)

Second hard phase grain 2 includes peripheral portion 22 that coats at least a portion of core portion 21. Peripheral portion 22 is formed in a below-described sintering step (fourth step) of sintering the cemented carbide. During liquid phase sintering, particles of the composite carbonitride and surrounding WC particles are dissolved with each other in the solid state and are dissolved and re-precipitated, whereby peripheral portion 22 is formed around core portion 21 as a composition that is rich in W and C with respect to the composition of the composite carbonitride ($Ti_{1-X-Z}Nb_XM_ZC_{1-Y}N_Y$) of core portion 21. Hence, peripheral portion 22 coats at least a portion of core portion 21 and has a composition different from that of core portion 21. Specifically, peripheral portion 22 is preferably a carbonitride containing Ti, Nb, and W.

Peripheral portion 22 functions as an adhesion layer for increasing an adhesion strength between second hard phase grain 2 and metal binder phase 3. Accordingly, an interface strength between second hard phase grain 2 and metal binder phase 3 can be suppressed from being decreased, whereby the mechanical property of the cemented carbide can be improved. As long as the effect of the present disclosure is exhibited, peripheral portion 22 may coat a portion or whole of core portion 21 and the thickness of peripheral portion 22 should not be limited. The composition of peripheral portion 22 should not be limited in particular as long as the effect of the present disclosure is exhibited and the composition of peripheral portion 22 is different from the composition of core portion 21. Examples of the composition of peripheral portion 22 include $Ti_{0.82}Nb_{0.13}W_{0.05}C_{0.05}N_{0.5}$, $Ti_{0.78}Nb_{0.14}W_{0.08}C_{0.65}N_{0.35}$, and the like.

<Metal Binder Phase>

Metal binder phase 3 includes an iron group element. That is, metal binder phase 3 is mainly composed of an iron group element. In addition to the iron group element, metal binder phase 3 can include: an inevitable element introduced from first hard phase grain 1 and second hard phase grain 2; a small amount of impurity element; or the like. In order to maintain metal binder phase 3 to be in a state of metal and avoid formation of a brittle intermediate compound, the content of the iron group element in metal binder phase 3 is preferably more than or equal to 90 atom % and is more preferably more than or equal to 95 atom %. The upper limit of the content of the iron group element in metal binder phase 3 is 100 atom %. Here, the iron group element refers to a group 8 element, a group 9 element, and a group 10 element in the fourth period, i.e., iron (Fe), cobalt (Co), and nickel (Ni). Examples of the element other than the iron group element and contained in metal binder phase 3 include titanium (Ti), tungsten (W), and the like.

Metal binder phase 3 is preferably mainly composed of Co. The content of the iron group element other than Co in metal binder phase 3 is preferably less than 1 volume % and is more preferably less than 0.5 volume %.

The content of metal binder phase 3 in the cemented carbide is preferably 7 to 15 volume %. When the content of metal binder phase 3 in the cemented carbide is less than 7 volume %, a sufficient adhesion strength is not obtained, with the result that a toughness tends to be decreased. When the content of metal binder phase 3 in the cemented carbide is more than 15 volume %, a hardness tends to be decreased. A more preferable content of metal binder phase 3 in the cemented carbide is 9 to 13 volume %. The content (volume %) of metal binder phase 3 can be calculated by the same method as the method of measuring the content of first hard phase grains 1.

Further, the total of the respective contents of first hard phase grains 1, second hard phase grains 2, and metal binder phase 3 is preferably more than or equal to 95 volume %, is more preferably more than or equal to 98 volume %, and is most preferably 100 volume %. Accordingly, an excellent reaction resistance against steel can be attained with a good yield.

[Method of Producing Cemented Carbide]

Although a method of producing the cemented carbide according to the present embodiment should not be limited particularly, it is preferable to employ the following method. That is, the method of producing the cemented carbide includes: a step (first step) of obtaining a powder of a composite carbonitride represented by $Ti_{1-X-Z}Nb_XM_ZC_{1-Y}N_Y$; a step (second step) of obtaining a powder mixture by using a ball mill to mix the powder of the composite carbonitride, a WC powder, and an iron group element powder for more than or equal to 9 hours and less than or equal to 15 hours; a step (third step) of obtaining a molded body by performing pressure molding to the powder mixture; and a step (fourth step) of obtaining a sintered material by sintering the molded body. In the $Ti_{1-X-Z}Nb_XM_ZC_{1-Y}N_Y$, the M is at least one impurity element selected from a group consisting of V, Cr, and Mo, the X is more than or equal to 0.1 and less than or equal to 0.2, the Y is more than or equal to 0.3 and less than or equal to 0.6, and the Z is more than or equal to 0 and less than or equal to 0.02. According to such a production method, it is possible to produce a cemented carbide having an excellent reaction resistance against steel.

<First Step>

The first step is a step of obtaining a powder of the composite carbonitride represented by $Ti_{1-X-Z}Nb_XM_ZC_{1-Y}N_Y$. The first step further includes the following steps. The first step, i.e., the step of obtaining the powder of the composite carbonitride includes: a step (mixing step) of obtaining a third powder by mixing a first powder including Ti and Nb and a second powder at least including graphite; a step (granulation step) of obtaining a granulated body by granulating the third powder; a step (thermal treatment step) of obtaining a powder precursor composed of the composite carbonitride by thermally treating the granulated body at more than or equal to 1800° C. under an atmosphere including nitrogen gas; and a step (pulverization step) of obtaining the powder of the composite carbonitride by pulverizing the powder precursor.

(Mixing Step)

In the mixing step, the third powder is obtained by mixing the first powder including Ti and Nb and the second powder at least including graphite.

The first powder includes Ti and Nb. The first powder is preferably an oxide containing Ti and Nb. When the first powder is an oxide, the primary particle size of a composite carbonitride powder to be obtained by the below-described pulverization step can be readily fine, whereby the integrated value of 50% in the area-based distribution of the grain sizes of the core portions (the D50 of the core portions) can be 0.2 to 2μm, for example. Further, the first powder may include one or more impurity elements selected from a group consisting of V, Cr, and Mo as a component introduced from a facility used for the production or the like. In this case, in the first powder, the total amount of V, Cr, and Mo is preferably less than 2 atom % with respect to the whole amount of Ti, Nb, V, Cr, and Mo. Specific examples of the first powder include a complex oxide such as $Ti_{0.9}N_{0.1}O_2$. The first powder may be a powder mixture containing an oxide powder such as $TiO_2$ or $Nb_2O_5$. The oxidation number of each element, the content of the impurity element, and the like can be changed unless contrary to the object.

The second powder at least includes graphite. In the mixing step, the third powder is obtained by mixing this second powder and the above-described first powder. This makes it possible to simultaneously and continuously perform the following reactions in the below-described thermal treatment step: a reduction reaction of the above-described oxide; a solid solution reaction due to Ti and Nb being diffused to each other in the reduced oxide; and a carbon nitriding reaction of Ti and Nb dissolved in the solid state. As a result, the composite carbonitride can be obtained efficiently.

For a method of mixing the first powder and the second powder, a conventionally known method can be used. However, in order to attain a small D50 (integrated value of 50% in an area-based distribution of particle sizes) of the third powder, a mixing method employing a dry type ball mill allowing for a high pulverization action, or a mixing method employing a wet type ball mill can be used suitably. Further, it is possible to use a mixing method employing a rotary blade type fluid mixer allowing for a low pulverization action or the like. The D50 of the third powder can be calculated based on all the particles of the third powder appearing in an observation image observed using a SEM (scanning electron microscope) at a magnification of 10000×. The equivalent circle diameters of all the particles of the third powder appearing in the observation image are calculated using the above-described image analysis software, and the equivalent circle diameter of a particle corresponding to the integrated value of 50% can be regarded as the D50 of the third powder. A mixture ratio of the first powder and the second powder is preferably as follows: when a ratio of the first powder is 1, a ratio of the second powder is 0.3 to 0.4.

(Granulation Step)

In the granulation step, the granulated body is obtained by granulating the above-described third powder. For a granulation method in the granulation step, a conventionally known granulation method can be used. Examples thereof include a method employing a known apparatus such as a spray dryer or an extrusion granulating machine. Further, for granulation, a binder component such as wax can be appropriately used as a binder, for example. The shape and dimension of the granulated body should not be limited particularly. For example, the granulated body can have a cylindrical shape having a diameter of 0.5 to 5 mm and a length of 5 to 20 mm.

(Thermal Treatment Step)

In the thermal treatment step, a powder precursor composed of the composite carbonitride is obtained by thermally treating the granulated body at more than or equal to 1800° C. under an atmosphere including nitrogen gas. In the thermal treatment step, under the atmosphere including nitrogen gas, oxygen in the oxide in the first powder included in the above-described granulated body reacts with graphite in the second powder, thereby reducing Ti and Nb in the first powder. Further, the reduced Ti and Nb are diffused to each other and accordingly undergo a solid solution reaction. At the same time, the reduced Ti and Nb undergo a carbon nitriding reaction in which the reduced Ti and Nb reacts with nitrogen in the atmosphere and graphite in the second powder. Accordingly, the powder precursor composed of the composite carbonitride represented by $Ti_{1-X-Z}Nb_XM_ZC_{1-Y}N_Y$ as described above is formed.

Here, in the thermal treatment step, the powder precursor composed of the above-described composite carbonitride is not obtained when a metal powder including Ti and Nb or a powder including a carbonitride of Ti and a carbonitride of Nb is mixed with the second powder instead of the first powder and the resulting powder mixture is thermally treated under the above-described conditions. This is due to the following reason: since a carbon nitriding reaction is progressed promptly in the metal powder including Ti and Nb by the thermal treatment, the solid solution reaction due to Ti and Nb being diffused to each other is not progressed. Another reason thereof is as follows: since the powder including the carbonitride of Ti and the carbonitride of Nb is chemically stable even in a high temperature region of more than 2000° C., the solid solution reaction due to Ti and Nb being diffused to each other is not progressed.

The atmosphere of the thermal treatment in the thermal treatment step should not be limited particularly as long as the atmosphere includes nitrogen gas. The atmosphere of the thermal treatment may be pure $N_2$ gas, or a mixed gas in which $N_2$ gas is mixed with hydrogen gas ($H_2$ gas), argon gas (Ar gas), helium gas (He gas), carbon monoxide gas (CO gas), or the like.

The temperature of the thermal treatment in the thermal treatment step is more than or equal to 1800° C. and is preferably more than or equal to 2000° C. in order to progress and promote the reduction reaction, solid solution reaction, and carbon nitriding reaction of the first powder. However, in order to prevent excessive aggregation of the powder precursor obtained by the thermal treatment, the temperature of the thermal treatment is preferably less than or equal to 2400° C.

A time for the thermal treatment in the thermal treatment step is preferably adjusted in accordance with the D50 of the third powder. For example, when the D50 of the third powder in which the first powder and the second powder are mixed with each other is 0.3 to 0.5 μm, the time for the thermal treatment is suitably 15 to 60 minutes. It is preferable that as the value of the D50 of the third powder is smaller, the time for the thermal treatment in the thermal treatment step is shorter, and that as the value of the D50 of the third powder is larger, the time for the thermal treatment in the thermal treatment step is longer.

In the thermal treatment step, it is preferable to use a rotary type continuous thermal treatment apparatus such as a rotary kiln. This thermal treatment apparatus includes an inclined rotary type reaction tube. Further, the thermal treatment apparatus includes: a heating mechanism for heating the rotary type reaction tube; a gas inlet for introducing gas including nitrogen to the rotary type reaction tube; a gas outlet for discharging the gas including nitrogen from the rotary type reaction tube; an introduction port for introducing the granulated body into the rotary type reaction tube; a removal port for removing the powder precursor from the rotary type reaction tube; and the like. Such a thermal treatment apparatus is preferable because the thermal treatment apparatus can thermally treat the granulated body under constant conditions and therefore can efficiently and continuously produce the powder precursor of the composite carbonitride with stable quality.

In the thermal treatment step, when the above-described thermal treatment apparatus is used, the rotary type reaction tube is first heated at more than or equal to 1800° C. using the heating mechanism and a nitrogen atmosphere is attained in the rotary type reaction tube by introducing gas including nitrogen gas from the gas inlet. Further, the granulated body is thermally treated by continuously supplying the granulated body from the introduction port located at an upper portion of the rotary type reaction tube and by rotating the rotary type reaction tube to move the granulated body in the rotary type reaction tube. Accordingly, the powder precursor composed of the composite carbonitride powder can be formed. This powder precursor can be removed from the removal port located at a lower portion of the rotary type reaction tube.

(Pulverization Step)

In the pulverization step, a powder of the above-described composite carbonitride is obtained by pulverizing the powder precursor obtained as described above. For a method of pulverizing the powder precursor, a conventionally known pulverization method can be used. Accordingly, the powder of the composite carbonitride represented by $Ti_{1-X-Z}Nb_XM_ZC_{1-Y}N_Y$ can be obtained. In $Ti_{1-X-Z}Nb_XM_ZC_{1-Y}N_Y$, M is at least one impurity element selected from a group consisting of V, Cr, and Mo, X is more than or equal to 0.1 and less than or equal to 0.2, Y is more than or equal to 0.3 and less than or equal to 0.6, and Z is less than or equal to 0 and less than or equal to 0.02.

<Second Step>

The second step is a step of obtaining a powder mixture by using a ball mill to mix the powder of the composite carbonitride, WC powder, and iron group element powder for more than or equal to 9 hours and less than or equal to 15 hours. These powders can be obtained by using a conventionally known mixing method employing a ball mill. For example, it is preferable to use: a mixing method employing a dry type ball mill allowing for a high pulverization action; or a mixing method employing a wet type ball mill. A time for mixing using this ball mill is more than or equal to 9 hours and less than or equal to 15 hours. The time for mixing using the ball mill is preferably more than or equal to 11 hours and less than or equal to 13 hours.

Accordingly, in the cemented carbide to be produced through the below-described sintering step (fourth step), the degree of dispersion of the composite carbonitride (core portions) can be increased.

When the time for mixing using the ball mill is less than 9 hours, the mixing may be insufficient, with the result that the degree of dispersion of the composite carbonitride (core portions) may not be increased sufficiently in the cemented carbide to be produced through the below-described sintering step (fourth step). When the time for mixing using the ball mill is more than 15 hours, the mixing may be excessive, with the result that a desired mechanical strength, particularly, a desired toughness may not be obtained in the cemented carbide to be produced through the below-described sintering step (fourth step).

<Third Step>

The third step is a step of obtaining a molded body by performing pressure molding to the powder mixture. For a method of performing pressure molding to the powder mixture, a conventionally known pressure molding method can be used. For example, the powder mixture can be provided in a metal mold, and can be formed into a predetermined shape under a predetermined pressure. Examples of the molding method include a dry type pressure molding method, a cold isostatic pressing method, an injection molding method, an extrusion molding method, and the like. A pressure during the molding is preferably about more than or equal to 0.5 ton weight/cm² (about 50 MPa) and less than or equal to 2.0 ton weight/cm² (about 200 MPa). The shape of the molded body may be determined in accordance with a desired shape of a product. For the shape of the molded body, a shape that is not too complicated is selected.

<Fourth Step>

The fourth step is a step of obtaining a sintered material by sintering the molded body. A method of sintering the molded body is preferably performed with the molded body being held for a predetermined time in a temperature region involving generation of a liquid phase. A sintering temperature is preferably more than or equal to 1300° C. and less than or equal to 1600° C. A holding time is preferably more than or equal to 0.5 hour and less than or equal to 2 hours, and is more preferably more than or equal to 1 hour and less than or equal to 1.5 hours. An atmosphere during the sintering is preferably an atmosphere of inert gas such as nitrogen or argon or vacuum (about less than or equal to 0.5 Pa). Accordingly, by performing machining as required after obtaining the sintered material, the cemented carbide can be obtained as a final product. The cemented carbide obtained by such a production method can have an excellent reaction resistance against steel.

Here, the composition and atomic ratio in the powder of the composite carbonitride can be determined by a conventionally known component analysis technique. For example, an inductive plasma emission spectrometry method, a high-frequency combustion method, or a thermal conductivity method can be used to identify the composition (metal, carbon, nitrogen, and the like) in the powder and the contents thereof.

The D50 of the powder of the composite carbonitride (the integrated value of 50% in the area-based distribution of the particle sizes) is preferably controlled to be more than or equal to 0.5 µm and less than or equal to 3.5 µm in order to attain ease of handling as well as an excellent reaction resistance against steel when applied as a cutting tool as described below. The D50 of the powder of the composite carbonitride can be calculated by the same method as the method of measuring the D50 of the third powder.

[Cutting Tool]

A cutting tool according to the present embodiment includes the above-described cemented carbide. Since the cutting tool of the present embodiment includes the above-described cemented carbide, the cutting tool can have an excellent reaction resistance against steel, in addition to an excellent mechanical strength intrinsic to cemented carbides.

Here, examples of application of the cutting tool include a drill, an end mill, an indexable cutting insert for drill, an indexable insert for end mill, a throwaway insert for milling, a throwaway insert for turning, a metal saw, a gear cutting tool, a reamer, a tap, a cutting bite, a wear-resistant tool, a friction stir welding tool, and the like.

When the cutting tool is an indexable cutting insert or the like, the substrate may or may not include a chip breaker. The shape of a cutting edge ridgeline, which is a main portion for cutting a workpiece, includes any of a sharp edge (a ridge where a rake face and a flank face meet each other), a honed edge (a sharp edge processed to be rounded), a negative land (beveled), a combination of the honed edge and the negative land, and the like.

Figure 4:
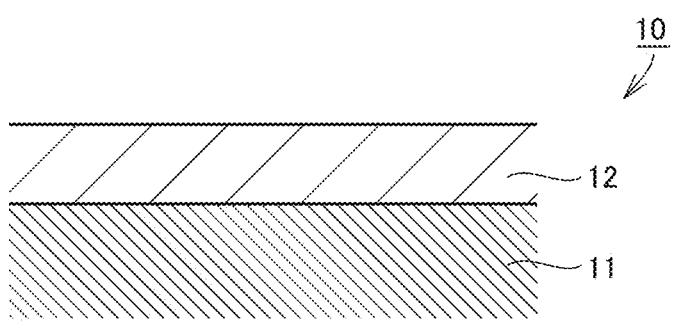
FIG. 4 is a partial cross sectional view showing an exemplary configuration of a cutting tool according to the present embodiment.

Further, the cutting tool according to the present embodiment includes: a substrate composed of the above-described cemented carbide; and a coating film that coats this substrate. FIG. 4 is a partial cross sectional view showing an exemplary configuration of the cutting tool according to the present embodiment. As shown in FIG. 4, cutting tool 10 incudes: a substrate 11 composed of the cemented carbide; and a coating film 12 that coats substrate 11 in contact with substrate 11. Since this cutting tool 10 further includes coating film 12, cutting tool 10 has more excellent wear resistance and breakage resistance, in addition to the excellent mechanical strength intrinsic to cemented carbides and the excellent reaction resistance against steel. Here, coating film 12 may coat the entire surface of substrate 11, or may coat only a portion thereof (for example, a cutting edge, which is a region that greatly contributes to a cuttability). Further, the composition of coating film 12 that coats substrate 11 should not be particularly limited, and a conventionally known coating film 12 can be appropriately employed. Examples of the composition of coating film 12 that coats substrate 11 include AlTiSiN, AlCrN, TiZrSiN, CrTaN, HfWSiN, CrAlN, TiN, TiBNO, TiCN, TiCNO, TiB$_2$, TiAlN, TiAlCN, TiAlON, TiAlONC, Al$_2$O$_3$, and the like.

For a method of coating, with the coating film, the substrate composed of the cemented carbide, a conventionally known method can be used. Examples thereof include a physical vapor deposition (PVD) method, a chemical vapor deposition (CVD) method, and the like. Particularly, for the PVD method, a resistive heating deposition method, an electron beam (EB) deposition method, a molecular beam epitaxy (MBE) method, an ion plating method, an ion beam deposition method, a sputtering method, or the like can be used, for example.

(Clauses)

The above description includes the following embodiments additionally described below.

(Clause 1)

A cemented carbide comprising: first hard phase grains each including WC; second hard phase grains each including a carbonitride containing Ti and Nb; and a metal binder phase including an iron group element, wherein each of the second hard phase grains includes a core portion in a form of a grain and a peripheral portion that coats at least a portion of the core portion, the core portion is composed of a composite carbonitride represented by Ti$_{1-X}$Nb$_X$C$_{1-Y}$N$_Y$, the X is more than or equal to 0.1 and less than or equal to 0.2, the Y is more than or equal to 0.3 and less than or equal to 0.6, the peripheral portion has a composition different from a composition of the core portion, and in a case where a total of 70 unit regions that are each constituted of a square having each side of 8 µm are provided by successively arranging 7 unit regions in a longitudinal direction and 10 unit regions in a lateral direction in an electron microscope image of any cross section of the cemented carbide captured at a magnification of 1500×, where the total number of core portions in the total of 70 unit regions is calculated by counting the number of core portions in each of the unit regions, and where a percentage of the number of core portions in each of the unit regions with respect to the total number of core portions is calculated, the number of unit regions in which the percentage is less than 0.43% or more than 2.43% is less than or equal to 10.

(Clause 2)

The cemented carbide according to clause 1, wherein each of the core portions the number of which is counted in each of the unit regions has a grain size of more than or equal to 0.2 μm and less than or equal to 3 μm.

(Clause 3)

The cemented carbide according to clause 1 or clause 2, wherein the peripheral portion is a carbonitride containing Ti, Nb, and W.

(Clause 4)

The cemented carbide according to any one of clause 1 to clause 3, wherein when the composite carbonitride includes at least one impurity element selected from a group consisting of V, Cr, and Mo, a total amount of V, Cr, and Mo is less than 2 atom % with respect to a whole amount of Ti, Nb, V, Cr, and Mo.

(Clause 5)

The cemented carbide according to any one of clause 1 to clause 4, wherein an integrated value of 50% in an area-based distribution of grain sizes of the core portions is more than or equal to 0.2 μm and less than or equal to 2 μm.

(Clause 6)

The cemented carbide according to any one of clause 1 to clause 5, wherein a volume ratio of the core portions in the cemented carbide is more than or equal to 2 volume % and less than or equal to 10 volume %.

(Clause 7)

A cutting tool comprising the cemented carbide recited in any one of clause 1 to clause 6.

(Clause 8)

The cutting tool according to clause 7, comprising a substrate composed of the cemented carbide; and a coating film that coats the substrate.

(Clause 9)

A method of producing a cemented carbide, the method comprising:

obtaining a powder of a composite carbonitride represented by $Ti_{1-X}Nb_XC_{1-Y}N_Y$;

obtaining a powder mixture by using a ball mill to mix the powder of the composite carbonitride, a WC powder, and an iron group element powder for more than or equal to 9 hours and less than or equal to 15 hours;

obtaining a molded body by performing pressure molding to the powder mixture; and obtaining a sintered material by sintering the molded body, wherein the X is more than or equal to 0.1 and less than or equal to 0.2, the Y is more than or equal to 0.3 and less than or equal to 0.6, and the obtaining of the powder of the composite carbonitride includes obtaining a third powder by mixing a first powder including Ti and Nb and a second powder at least including graphite, obtaining a granulated body by granulating the third powder, obtaining a powder precursor composed of the composite carbonitride by thermally treating the granulated body at more than or equal to 1800° C. under an atmosphere including nitrogen gas, and obtaining the powder of the composite carbonitride by pulverizing the powder precursor.

EXAMPLES

While the present disclosure will be described more in detail hereinafter with reference to Examples, the present disclosure is not limited thereto.

Example 1

<Production of Samples 11 to 13 and Samples 111 to 114>

(First Step)

As the first powder, a TiO2 powder (size of about 0.5 μm; provided by Kojundo Chemical Laboratory) and a $Nb_2O_5$ powder (size of about 1 μgm; provided by Kojundo Chemical Laboratory) were prepared. As the second powder, a graphite powder (size of about 5 μm; provided by Kojundo Chemical Laboratory) was prepared. These were mixed at a blending ratio to obtain each of compositions of composite carbonitrides represented in samples 11 to 13 and samples 113 to 114 and compositions of carbonitrides represented in samples 111 and 112 in Table 1, thereby obtaining the third powder (mixing step). The mixing was performed in accordance with a ball mill method.

Next, the third powder was granulated using an extrusion granulating machine (extrusion hole diameter: (φ2.5 mm) to obtain granulated bodies having cylindrical shapes having an average diameter of 2.4 mm and an average length of about 10 mm (granulation step). The average diameter and average length of the granulated bodies were measured using a micrometer.

Next, by thermally treating the granulated body at 1800° C. in a nitrogen atmosphere using the above-described rotary kiln, a powder precursor composed of the composite carbonitride was obtained (thermal treatment step). A time during which the granulated body passed through a heating section in the rotary kiln was about 30 minutes.

Finally, the powder precursor was dry-pulverized using a known pulverizer (a rolling ball mill with a cemented carbide ball of φ4.5 mm being used as a pulverizing medium), thereby obtaining each of powders of composite carbonitrides of samples 11 to 13 and samples 113 to 114 having compositions shown in Table 1 and obtaining powders of carbonitrides of samples 111 and 112 having compositions shown in Table 1 (pulverization step). The compositions of the powders of the composite carbonitrides and carbonitrides were measured using the method described above.

(Second Step)

A powder mixture was obtained by mixing 10 volume % of the above-described powder of each of the composite carbonitrides or the carbonitrides, 75 volume % of commercially available WC powder (trademark: "WC-25" provided by Japan New Metals), and 15 volume % of commercially available Co powder (size of about 5 μm; provided by Kojundo Chemical Laboratory) serving as an iron group element powder. This mixing was performed by a wet ball mill method for 10 hours. However, in the case of sample 114, a powder mixture was obtained by mixing, by the wet ball mill method for 5 hours, 10 volume % of the powder of the composite carbonitride, 75 volume % of the above-described WC powder, and 15 volume % of the above-described Co powder.

(Third Step)

A molded body was obtained by granulating the above-described powder mixture using camphor and ethanol and performing press molding under a pressure of 1 ton weight/cm$^2$ (about 98 MPa).

(Fourth Step)

The molded body was sintered using a liquid phase sintering method under a vacuum (0.1 Pa) atmosphere at 1410° C. for a holding time of 1 hour, thereby obtaining a sintered material. Next, a sintered skin of this sintered material was cut and removed using a diamond wheel of number (#) 400 (the number (#) means fineness of abrasive grains; as the number is larger, the abrasive grains are finer), thereby obtaining a cutting tool (each of samples 11 to 13 and samples 111 to 114) having a shape of SNGN120408 and composed of the cemented carbide.

The compositions of the core portions of the second hard phase grains in these cutting tools (cemented carbides) were analyzed using an EDX by the above-described method, and coincided with the respective compositions of the powders of the composite carbonitrides and carbonitrides shown in Table 1. By the EDX, it was confirmed that the peripheral portions had compositions obtained by adding W to the compositions of the core portions. By visual observation of an electron microscope image, it was confirmed that each of the peripheral portions coated at least a portion of a core portion. Further, by the EDX, it was also confirmed that an impurity element such as V, Cr, or Mo was not included as M in each of the composite carbonitrides and carbonitrides ($Ti_{1-X-Z}Nb_XM_ZC_{1-Y}N_Y$) of the core portions (i.e., Z=0).

Table 1 shows the compositions of the peripheral portions in samples 11 to 13 and samples 111 to 114. Further, each of the cutting tools (cemented carbides) of samples 11 to 13 and samples 111 to 114 was analyzed using the above-described measurement methods with regard to the integrated value of 50% in the area-based distribution of the grain sizes of the core portions and the degree of dispersion of the core portions (the number of unit regions in which the number of core portions indicated by the percentage was less than 0.43% or more than 2.43%). Analysis results thereof are shown in Table 1. In each of the cutting tools (cemented carbides) of samples 11 to 13 and samples 111 to 114, the volume ratio of the core portions in the cemented carbide was 10 volume %.

Further, FIG. 2A to FIG. 2C and FIG. 3A to FIG. 3C show: an electron microscope image for analyzing the degree of dispersion of the core portions in each of samples 12 and 114 (FIG. 2A and FIG. 3A); the number of core portions in each unit region (FIG. 2B and FIG. 3B); and the percentage thereof (FIG. 2C and FIG. 3C).

<Cutting Test>

As a cutting test, each of the cutting tools of samples 11 to 13 and samples 111 to 114 was subjected to a test for reaction resistance against steel under the below-described conditions. Results thereof are shown in Table 1. Here, the cutting tools of samples 11 to 13 correspond to Examples of the present disclosure, the cutting tools of samples 111 to 113 correspond to Comparative Examples, and sample 114 corresponds to a Reference Example.

(Test for Reaction Resistance Against Steel)
Workpiece: SCM435
Peripheral speed: 150 m/min
Feed: 0.15 mm/rev
Depth of cut: 1.5 mm
Cutting oil: None In the test for reaction resistance against steel, a cutting time (minute as a unit) until the flank wear width of the cutting edge of the cutting tool of each sample became more than or equal to 0.2 mm was measured in order to evaluate welding wear. As this time is longer, the reaction resistance against steel is evaluated to be more excellent.

TABLE 1

| | Composition of Core Portion Composite Carbonitride: $Ti_{1-X-Z}Nb_XM_ZC_{1-Y}N_Y$ | | Composition of Peripheral Portion | Core Portion D50 (μm) | Degree of Dispersion (Number of Regions in which Degree of Dispersion was Less Than 0.43 and More Than 2.43) | Result of Cutting Test Reaction Resistance Against Steel (min) |
|---|---|---|---|---|---|---|
| | X | Y | | | | |
| Sample 11 | 0.1 | 0.5 | $Ti_{0.83}Nb_{0.09}W_{0.08}C_{0.54}N_{0.46}$ | 1.2 | 6 | 29.3 |
| Sample 12 | 0.15 | 0.5 | $Ti_{0.76}Nb_{0.14}W_{0.1}C_{0.54}N_{0.46}$ | 0.4 | 4 | 27.1 |
| Sample 13 | 0.2 | 0.5 | $Ti_{0.73}Nb_{0.18}W_{0.09}C_{0.54}N_{0.46}$ | 1.8 | 5 | 31.4 |
| Sample 111 | 0 | 0.5 | $Ti_{0.8}W_{0.2}C_{0.54}N_{0.46}$ | 1.5 | 9 | 18.2 |
| Sample 112 | 1 | 0.5 | $Nb_{0.8}W_{0.2}C_{0.54}N_{0.46}$ | 2.3 | 13 | 13.7 |
| Sample 113 | 0.3 | 0.5 | $Ti_{0.62}Nb_{0.28}W_{0.1}C_{0.54}N_{0.46}$ | 1.8 | 8 | 18.4 |
| Sample 114 | 0.15 | 0.5 | $Ti_{0.76}Nb_{0.14}W_{0.1}C_{0.54}N_{0.46}$ | 3.5 | 12 | 17.1 |

<Review>

According to Table 1, it is understood that the cutting tools of the Examples (samples 11 to 13) had more excellent reaction resistances against steel than those of the cutting tools of the Comparative Examples (samples 111 to 113) and the cutting tool of the Reference Example (sample 114).

Example 2

<Production of Samples 21 to 27 and Samples 211 to 216>

(First Step)

As the first powder, a $TiO_2$ powder (size of about 0.5 μm; provided by Kojundo Chemical Laboratory) and a $Nb_2O_5$ powder (size of about 1 μm; provided by Kojundo Chemical Laboratory) were prepared. As the second powder, a graphite powder (size of about 5 μm; provided by Kojundo Chemical Laboratory) was prepared. These were mixed at a blending ratio to obtain each of compositions of composite carbonitrides represented in samples 21 to 27 and samples 211 to 216 in Table 2, thereby obtaining the third powder (mixing step). The mixing was performed in accordance with a ball mill method. Here, in the case of each of samples 215 and 216, a $WO_3$ powder (purity of 3N; provided by Kojundo Chemical Laboratory) was also added into the first powder in order to obtain the composition of the composite carbonitride shown in Table 2.

Next, the same granulation step, thermal treatment step, and pulverization step as those of Example 1 were performed, thereby obtaining powders of composite carbonitrides having compositions of samples 21 to 27 and samples 211 to 216 in Table 2.

(Second Step)

A powder mixture was obtained by mixing 5 volume % of the above-described powder of each of the composite carbonitrides, 85 volume % of a commercially available WC powder (trademark: "WC-25" provided by Japan New Metals), and 10 volume % of a commercially available Co powder (size of about 5 µm; provided by Kojundo Chemical Laboratory) serving as an iron group element powder. This mixing was performed in accordance with a wet ball mill method for 10 hours using the same ball and mill as those of Example 1. However, in the case of samples 213 and 214, powder mixtures were obtained by mixing, by the wet ball mill method respectively for 3 hours and 5 hours, 5 volume % of the powder of the composite carbonitride, 85 volume % of the above-described WC powder, and 10 volume % of the above-described Co powder.

(Third Step and Fourth Step)

Next, by performing the third step and fourth step in the same manner as in Example 1, cutting tools (samples 21 to 27 and samples 211 to 216) were obtained which each had a shape of SNGN120408 and which were composed of respective cemented carbides.

The compositions of the core portions of the second hard phase grains in these cutting tools (cemented carbides) were analyzed using an EDX by the above-described method, and coincided with the respective compositions of the powders of the composite carbonitrides of Table 2. By the EDX, it was confirmed that the peripheral portions had compositions obtained by adding W to the compositions of the core portions. By visual observation of an electron microscope image, it was confirmed that each of the peripheral portions coated at least a portion of a core portion. Further, by the EDX, it was also confirmed that an impurity element such as V, Cr, or Mo was not included as M in the composite carbonitride ($Ti_{1-X-Z}Nb_XM_ZC_{1-Y}N_Y$) of the core portion (i.e., Z=0).

Table 2 shows the compositions of the peripheral portions in samples 21 to 27 and samples 211 to 216. Further, each of the cutting tools (cemented carbides) of samples 21 to 27 and samples 211 to 216 was analyzed using the above-described measurement methods with regard to the integrated value of 50% in the area-based distribution of the grain sizes of the core portions and the degree of dispersion of the core portions (the number of unit regions in which the number of core portions indicated by the percentage was less than 0.43% or more than 2.43%). Analysis results thereof are shown in Table 2. In each of the cutting tools (cemented carbides) of samples 21 to 27 and samples 211 to 216, the volume ratio of the core portions in the cemented carbide was 5 volume %.

<Cutting Test>

As a cutting test, each of the cutting tools of samples 21 to 27 and samples 211 to 216 was subjected to a test for reaction resistance against steel under the same conditions as those in Example 1. Results thereof are shown in Table 2. Here, the cutting tools of samples 21 to 27 correspond to Examples of the present disclosure, and the cutting tools of samples 211 to 216 correspond to Comparative Examples.

TABLE 2

| | Composition of Core Portion Composite Carbonitride: $Ti_{1-X-Z}Nb_XM_ZC_{1-Y}N_Y$ | Composition of Peripheral Portion | Core Portion D50 (µm) | Degree of Dispersion (Number of Regions in which Degree of Dispersion was Less Than 0.43 and More Than 2.43) | Result of Cutting Test Reaction Resistance Against Steel (min) |
|---|---|---|---|---|---|
| Sample 21 | $Ti_{0.85}Nb_{0.15}C_{0.5}N_{0.5}$ | $Ti_{0.78}Nb_{0.14}W_{0.08}C_{0.54}N_{0.46}$ | 1.5 | 7 | 23.7 |
| Sample 22 | $Ti_{0.9}Nb_{0.1}C_{0.7}N_{0.3}$ | $Ti_{0.83}Nb_{0.09}W_{0.08}C_{0.72}N_{0.28}$ | 1.2 | 6 | 23.9 |
| Sample 23 | $Ti_{0.9}Nb_{0.1}C_{0.5}N_{0.5}$ | $Ti_{0.83}Nb_{0.09}W_{0.08}C_{0.54}N_{0.46}$ | 1.9 | 8 | 22.2 |
| Sample 24 | $Ti_{0.9}Nb_{0.1}C_{0.6}N_{0.4}$ | $Ti_{0.83}Nb_{0.09}W_{0.08}C_{0.63}N_{0.37}$ | 0.5 | 4 | 25.3 |
| Sample 25 | $Ti_{0.8}Nb_{0.2}C_{0.4}N_{0.6}$ | $Ti_{0.73}Nb_{0.18}W_{0.09}C_{0.73}N_{0.27}$ | 0.9 | 5 | 23.2 |
| Sample 26 | $Ti_{0.8}Nb_{0.2}C_{0.7}N_{0.3}$ | $Ti_{0.73}Nb_{0.18}W_{0.09}C_{0.72}N_{0.28}$ | 1.1 | 5 | 21.9 |
| Sample 27 | $Ti_{0.8}Nb_{0.2}C_{0.6}N_{0.4}$ | $Ti_{0.73}Nb_{0.18}W_{0.09}C_{0.46}N_{0.64}$ | 1.4 | 6 | 24.8 |
| Sample 211 | $Ti_{0.95}Nb_{0.05}C_{0.5}N_{0.5}$ | $Ti_{0.89}Nb_{0.05}W_{0.06}C_{0.53}N_{0.47}$ | 1.8 | 10 | 12.8 |
| Sample 212 | $Ti_{0.75}Nb_{0.25}C_{0.5}N_{0.5}$ | $Ti_{0.68}Nb_{0.23}W_{0.09}C_{0.55}N_{0.45}$ | 0.4 | 7 | 11.5 |
| Sample 213 | $Ti_{0.85}Nb_{0.15}C_{0.8}N_{0.2}$ | $Ti_{0.78}Nb_{0.14}W_{0.08}C_{0.82}N_{0.18}$ | 2.6 | 21 | 11.7 |
| Sample 214 | $Ti_{0.85}Nb_{0.15}C_{0.3}N_{0.7}$ | $Ti_{0.78}Nb_{0.14}W_{0.08}C_{0.36}N_{0.64}$ | 2.8 | 16 | 17.3 |
| Sample 215 | $Ti_{0.85}Nb_{0.08}W_{0.07}C_{0.5}N_{0.5}$ | $Ti_{0.72}Nb_{0.14}W_{0.14}C_{0.54}N_{0.46}$ | 2.3 | 15 | 6.9 |
| Sample 216 | $Ti_{0.75}Nb_{0.15}W_{0.1}C_{0.5}N_{0.5}$ | $Ti_{0.69}Nb_{0.14}W_{0.17}C_{0.54}N_{0.46}$ | 3.1 | 19 | 3.8 |

<Review>

According to Table 2, it is understood that the cutting tools of the Examples (samples 21 to 27) had more excellent reaction resistances against steel than those of the cutting tools of the Comparative Examples (samples 211 to 216).

Example 3

<Production of Samples 31 to 37>

As the first powder, a $TiO_2$ powder (size of about 0.5 µm; provided by Kojundo Chemical Laboratory) and a $Nb_2O_5$ powder (size of about 1 µm; provided by Kojundo Chemical Laboratory) were prepared. As the second powder, a graphite powder (size of about 5 µm; provided by Kojundo Chemical Laboratory) was prepared. Further, for each of samples 31 to 37, when preparing the first powder, a $V_2O_5$ powder (purity of 3N; provided by Kojundo Chemical Laboratory), a $Cr_2O_3$ powder (size of about 3 µm; provided by Kojundo Chemical Laboratory), and a $MoO_3$ powder (purity of 3N; provided by Kojundo Chemical Laboratory) were added to the first powder such that in the composition of the composite carbonitride ($Ti_{1-X-Z}Nb_XM_ZC_{1-Y}N_Y$), impurity elements (V, Cr, and Mo; these are represented as M in the composition) are included to attain a total amount (atom %) of the impurity elements with respect to a whole amount of Ti, Nb, V, Cr, and Mo as shown in Table 3. The compositions of samples 31 to 37 other than the impurity elements were the same as that of sample 12, and cemented carbides were produced. However, a product shape was CNGN120404 in Example 3.

Further, the cemented carbides of samples 31 to 37 were used as substrates, and the substrates were coated with coating films composed of TiAlN under below-described PVD conditions, thereby producing cutting tools of samples 31 to 37.

(PVD Conditions)
AlTi target (target composition: Al:Ti=50:50)
Arc current: 100 A
Bias voltage: −100 V
Pressure in chamber: 4.0 Pa
Reactive gas: nitrogen Each of the cutting tools of samples 31 to 37 was subjected to a cutting test (test for reaction resistance against steel) under the same conditions as those in Example 1. Results thereof are shown in Table 3. However, in the test for reaction resistance against steel in Example 3, a cutting time was 5 minutes, and a sample with a cutting edge having a flank wear width of less than 0.2 mm when 5 minutes elapsed was evaluated as a good product. For a sample with a cutting edge confirmed to have a flank wear width of more than or equal to 0.2 mm before 5 minutes elapsed, Table 3 shows a time at which the cutting edge was confirmed to have a flank wear width of more than or equal to 0.2 mm.

TABLE 3

| | Composition of Core Portion Composite Carbonitride: $Ti_{1-X-Z}Nb_XM_ZC_{1-Y}N_Y$ | | Amount of Impurity Elements atm. % | | | Result of Cutting Test Reaction Resistance Against Steel (min) |
|---|---|---|---|---|---|---|
| | X | Y | Amount of V | Amount of Cr | Amount of Mo | |
| Sample 31 | 0.15 | 0.5 | 1 | 0 | 0 | 5 |
| Sample 32 | 0.15 | 0.5 | 0 | 1 | 0 | 5 |
| Sample 33 | 0.15 | 0.5 | 0 | 0 | 1 | 5 |
| Sample 34 | 0.15 | 0.5 | 0 | 0 | 2 | 3.7 |
| Sample 35 | 0.15 | 0.5 | 0 | 0 | 3 | 1.5 |
| Sample 36 | 0.15 | 0.5 | 0 | 1 | 1 | 2.3 |
| Sample 37 | 0.15 | 0.5 | 1 | 1 | 0 | 3.1 |

<Review>

According to Table 3, it is understood that each of the cutting tools of samples 31 to 33, in each of which the total amount of V, Cr, and Mo was less than 2 atom % (i.e., Z was more than or equal to 0 and less than 0.02) with respect to the whole amount of Ti, Nb, V, Cr, and Mo in the composite carbonitride of the core portion, had a more excellent reaction resistance against steel than those of the cutting tools of samples 34 to 37, thus attaining a long life.

Example 4

<Production of Samples 41 to 46>

In the case of each of samples 41 to 46, first, a powder having the same amount of impurity elements (V, Cr and Mo) as that of sample 31 and having the same composition of composite carbonitride as that of sample 31 was used and particle sizes of the powder were adjusted by pulverizing this powder in advance in accordance with the ball mill method in order to attain a D50 (integrated value of 50% in the area-based distribution of the grain sizes) of core portions as shown in Table 4 (first step). Then, by performing the second step, the third step, and the fourth step in the same manner as in Example 2, cutting tools of samples 41 to 46 were produced which each had a shape of SNGN120408 and which were composed of cemented carbides. Each of these cutting tools was subjected to the same test for reaction resistance against steel as that in Example 1. Results are shown in Table 4.

TABLE 4

| | Integrated Value of 50% of Grain Sizes of Core Portions (D50) | Result of Cutting Test Reaction Resistance Against Steel (min) |
|---|---|---|
| Sample 41 | 0.1 | 19.3 |
| Sample 42 | 0.2 | 23.3 |
| Sample 43 | 0.5 | 27.2 |
| Sample 44 | 1 | 26.4 |
| Sample 45 | 2 | 24.3 |
| Sample 46 | 3 | 19.3 |

<Review>

According to Table 4, it is understood that each of the cutting tools of samples 42 to 45 in each of which the D50 of the core portions fell within a range of 0.2 to 2 μm had a more excellent reaction resistance against steel than those of the cutting tools of samples 41 and 46.

Example 5

<Production of Samples 51 to 56>

For each of samples 51 to 56, a cutting tool composed of a cemented carbide was produced in the same manner as in sample 12 except that the above-described powder of the composite carbonitride, WC powder, and Co powder in sample 12 were adjusted to attain a volume ratio (%) of the core portions in the cemented carbide as shown in Table 5 and then the second step was performed. However, a product shape was TNGN160404 in Example 5. Each of these cutting tools was subjected to the same test for reaction resistance against steel under the same conditions as those in Example 1. Results are shown in Table 5.

TABLE 51

| | Volume Ratio (%) of Core Portions in Cemented Carbide | Result of Cutting Test Reaction Resistance Against Steel (min) |
|---|---|---|
| Sample 51 | 1 | 19.1 |
| Sample 52 | 2 | 22.7 |
| Sample 53 | 5 | 25.8 |
| Sample 54 | 8 | 32.4 |
| Sample 55 | 10 | 24.4 |
| Sample 56 | 11 | 18.7 |

<Review>

According to Table 5, it is understood that each of the cutting tools of samples 52 to 55 in each of which the volume ratio (%) of the core portions in the cemented carbide was 2 to 10 volume % had a more excellent reaction resistance against steel than those in the cutting tools of samples 51 and 56.

Heretofore, the embodiments and examples of the present disclosure have been illustrated, but it has been initially expected to appropriately combine configurations of the embodiments and examples.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: first hard phase grain; 2: second hard phase grain; 10: cutting tool; 11: substrate; 12: coating film; 21: core portion; 22: peripheral portion; 3: metal binder phase; R: unit region.

The invention claimed is:

1. A cemented carbide comprising: first hard phase grains each including WC; second hard phase grains each including a carbonitride containing Ti and Nb; and a metal binder phase including an iron group element, wherein
each of the second hard phase grains includes a core portion in a form of a grain and a peripheral portion that coats at least a portion of the core portion,
the core portion is composed of a composite carbonitride represented by $Ti_{1-X-Z}Nb_XM_ZC_{1-Y}N_Y$,
the M is at least one impurity element selected from a group consisting of V, Cr, and Mo,
the X is more than or equal to 0.1 and less than or equal to 0.2,
the Y is more than or equal to 0.3 and less than or equal to 0.6,
the Z is more than or equal to 0 and less than or equal to 0.02,
the peripheral portion has a composition different from a composition of the core portion, and
a number of unit regions in which a percentage of the number of core portions in each of the unit regions with respect to the total number of core portions is less than 0.43% or more than 2.43% is less than or equal to 10, where
the cemented carbide has a total of 70 unit regions,
the total of 70 unit regions that are each constituted of a square having each side of 8 μm are provided by successively arranging 7 unit regions in a longitudinal direction and 10 unit regions in a lateral direction in an electron microscope image of any cross section of the cemented carbide captured at a magnification of 1500×, and
the total number of core portions in the total of 70 unit regions is calculated by counting the number of core portions in each of the unit regions.

2. The cemented carbide according to claim 1, wherein each of the core portions the number of which is counted in each of the unit regions has a grain size of more than or equal to 0.2 μm and less than or equal to 3 μm.

3. The cemented carbide according to claim 1, wherein the peripheral portion is a carbonitride containing Ti, Nb, and W.

4. The cemented carbide according to claim 1, wherein an integrated value of 50% in an area-based distribution of grain sizes of the core portions is more than or equal to 0.2 μm and less than or equal to 2 μm.

5. The cemented carbide according to claim 1, wherein a volume ratio of the core portions in the cemented carbide is more than or equal to 2 volume % and less than or equal to 10 volume %.

6. A cutting tool comprising the cemented carbide recited in claim 1.

7. The cutting tool according to claim 6, comprising: a substrate composed of the cemented carbide; and a coating film that coats the substrate.

8. A method of producing a cemented carbide, the method comprising:
obtaining a powder of a composite carbonitride represented by $Ti_{1-X-Z}Nb_XM_ZC_{1-Y}N_Y$;
obtaining a powder mixture by using a ball mill to mix the powder of the composite carbonitride, a WC powder, and an iron group element powder for more than or equal to 9 hours and less than or equal to 15 hours;
obtaining a molded body by performing pressure molding to the powder mixture; and
obtaining a sintered material by sintering the molded body, wherein
the M is at least one impurity element selected from a group consisting of V, Cr, and Mo,
the X is more than or equal to 0.1 and less than or equal to 0.2,
the Y is more than or equal to 0.3 and less than or equal to 0.6,
the Z is more than or equal to 0 and less than or equal to 0.02, and
the obtaining of the powder of the composite carbonitride includes
obtaining a third powder by mixing a first powder including Ti and Nb and a second powder at least including graphite,
obtaining a granulated body by granulating the third powder,
obtaining a powder precursor composed of the composite carbonitride by thermally treating the granulated body at more than or equal to 1800° C. under an atmosphere including nitrogen gas, and
obtaining the powder of the composite carbonitride by pulverizing the powder precursor.

* * * * *